United States Patent
Sugahara (10) Patent No.: US 8,075,127 B2
(45) Date of Patent: Dec. 13, 2011

(54) PRINTING APPARATUS, PROGRAM, STORAGE MEDIUM, METHOD, AND INK

(75) Inventor: Hiroto Sugahara, Aichi-ken (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 1083 days.

(21) Appl. No.: 11/903,954

(22) Filed: Sep. 25, 2007

(65) Prior Publication Data
US 2008/0074483 A1    Mar. 27, 2008

(30) Foreign Application Priority Data
Sep. 26, 2006 (JP) .................. 2006-260914

(51) Int. Cl.
*B41J 2/01* (2006.01)
(52) U.S. Cl. ............. 347/102; 347/104; 347/14; 347/16
(58) Field of Classification Search ............. 347/14–16, 347/104, 102
See application file for complete search history.

(56) References Cited

U.S. PATENT DOCUMENTS

| | | | | |
|---|---|---|---|---|
| 4,978,969 A * | 12/1990 | Chieng | ............ | 347/102 |
| 4,992,347 A * | 2/1991 | Hawkins et al. | ............ | 430/10 |
| 5,045,420 A * | 9/1991 | Hosono et al. | ............ | 430/120.4 |
| 5,337,076 A * | 8/1994 | Agano | ............ | 347/253 |
| 5,777,639 A | 7/1998 | Kageyama et al. | | |
| 6,000,870 A * | 12/1999 | Koga | ............ | 400/605 |
| 6,652,086 B1 * | 11/2003 | Tomida et al. | ............ | 347/101 |
| 2003/0197771 A1 * | 10/2003 | Klinefelter et al. | ............ | 347/104 |
| 2005/0140765 A1 * | 6/2005 | Masumi et al. | ............ | 347/102 |
| 2006/0228138 A1 * | 10/2006 | Mori | ............ | 399/391 |
| 2008/0315501 A1 * | 12/2008 | Cappello et al. | ............ | 271/110 |

FOREIGN PATENT DOCUMENTS

| | | |
|---|---|---|
| JP | 5016342 | 1/1993 |
| JP | 5185588 | 7/1993 |
| JP | 11048627 | 2/1999 |

* cited by examiner

*Primary Examiner* — Matthew Luu
*Assistant Examiner* — Rut Patel
(74) *Attorney, Agent, or Firm* — Frommer Lawrence & Haug LLP (57) ABSTRACT

A printing apparatus having an ink-jet head which discharges an ink toward a medium, a UV light source, a movement mechanism which moves the medium, and a controller. When the printing mode is selected, the controller controls the ink-jet head to discharge the ink toward the medium, and the controller controls the UV light source to radiate a small amount of the ultraviolet light to cure the ink. When the erasing mode is selected, the controller controls the UV light source to radiate a large amount of the ultraviolet light toward the medium to decolorize the ink. Accordingly, the medium, on which the printing has been once performed, can be reused quickly and reliably. Further, the printing can be performed on a variety of media.

10 Claims, 7 Drawing Sheets

PRINTING APPARATUS, PROGRAM, STORAGE MEDIUM, METHOD, AND INK

CROSS REFERENCE TO RELATED APPLICATION

The present application claims priority from Japanese Patent Application No. 2006-260914 filed on Sep. 26, 2006, the disclosure of which is incorporated herein by reference in its entirety.

BACKGROUND OF THE INVENTION

1. Field of the Invention

The present invention relates to an ink (UV-curable decolorizable ink) containing a coloring component which is decolorizable by the ultraviolet light and a curing component which is curable by the ultraviolet light, a printing apparatus for performing a printing process and a decolorizing process by using the UV-curable decolorizable ink, and a program, a storage medium, and a method to be used therefor.

2. Description of the Related Art

In recent years, as the progress of office automation is advanced, the opportunities are increased, in which the computer data is printed on the paper, for example, for the purpose of the hard copy. In such situations, the amount of consumption of the paper is increased. Therefore, the deforestation is carried out in succession in order to secure the wood to be used as the raw material of the paper, and the serious environmental problem, i.e., the forest destruction is caused. In view of the above, a countermeasure is suggested such that the image, which has been printed on the paper, is erased, and the paper, which has been subjected to the printing, is reused without being discarded.

For example, an ink-jet printer, which is disclosed in Japanese Patent Application Laid-open No. 5-185588, uses a water base ink containing a dye which is modified and decolorized when the ultraviolet light is radiated thereon. The ink-jet printer is provided with an ultraviolet radiation lamp at the upstream of an ink-jet head for jetting the ink. According to this ink-jet printer, when the ordinary printing is performed, then the paper sheet is transported in a state in which the ultraviolet radiation lamp is turned OFF, and the ink-jet head is driven so that the ink is discharged toward the paper sheet to perform the printing. On the other hand, when the printed image is erased, then the paper sheet is transported in a state in which the driving of the ink-jet head is stopped, and the ultraviolet radiation lamp is turned ON. The dye of the ink is decolorized by the ultraviolet light radiated from the ultraviolet radiation lamp, and the paper sheet is discharged while returning into the blank paper state.

However, the ink-jet printer disclosed in Japanese Patent Application Laid-open No. 5-185588 uses the water base ink. Therefore, when the ink is discharged from the ink-jet head, and the ink is deposited to the paper sheet, then water or the like as the solvent is evaporated, and the dye, which is decolorizable by the ultraviolet light, is deeply permeated into the fiber of the paper. In such a situation, the ultraviolet light, which is radiated from the ultraviolet radiation lamp, is hardly absorbed by the dye sufficiently, and it takes a long period of time in order to completely erase the printed image. Further, when the water base ink is used, a problem also arises such that the printing is hardly performed on any medium which has the low water permeability.

SUMMARY OF THE INVENTION

In view of the above, an object of the present invention resides in that any matter, which has been once subjected to the printing, can be reused quickly and reliably, and the printing can be performed on a variety of media.

According to a first aspect of the present invention, there is provided a printing apparatus which performs printing on a medium, including: an ink-jet head which discharges an ink toward the medium, the ink containing a coloring component which is decolorizable by ultraviolet light and a curing component which is curable by the ultraviolet light, and a light amount of the ultraviolet light required for curing being smaller than a light amount of the ultraviolet light required for decolorization; a UV light source which radiates the ultraviolet light toward the medium; a movement mechanism which moves the medium in a predetermined direction relative to the ink-jet head and the UV light source to move a discharge area in which the ink-jet head discharges the ink and a radiation area in which the UV light source radiates the ultraviolet light; and a controller which receives any one of instructions of a plurality of operation modes including a printing mode and an erasing mode and which controls the ink-jet head and the UV light source in accordance with the instructed mode. When the printing mode is selected, the controller controls the inkjet head and the UV light source to perform a printing process in which the ink-jet head discharges the ink toward the medium to deposit the ink to the medium, and the UV light source radiates the ultraviolet light, in a light amount that the coloring component is not decolorized, toward the ink deposited to the medium to cure the curing component; and when the erasing mode is selected, the controller controls the inkjet head and the UV source to perform an erasing process in which the UV light source radiates, toward the medium, the ultraviolet light in a light amount larger than the light amount of the ultraviolet light radiated during the printing process to decolorize the coloring component.

According to the first aspect of the present invention, the ink (the UV-curable decolorizable ink), which is discharged from the ink-jet head and which is deposited to the medium, is cured on the medium by the ultraviolet light radiated from the UV light source. Therefore, the coloring component is fixedly secured, while the coloring component is not deeply permeated into the medium as compared with the water base ink or the like. Accordingly, when the erasing process is performed, the ultraviolet light, which is radiated from the UV light source, is sufficiently absorbed by the coloring component with ease. The coloring component can be efficiently decolorized or decolored. Therefore, the medium, which has been once subjected to the printing, can be reused quickly and reliably. Further, the UV-curable decolorizable ink is cured and fixedly secured on the surface of the medium. Therefore, the printing process and the erasing process can be performed not only on the material such as the paper having the high water permeability but also on the material having the low water permeability including, for example, the metal, the wood and the resin.

In the printing apparatus of the present invention, the identical UV light source can be also used for both of the printing process and the erasing process. In such a situation, it is unnecessary to independently provide the UV light sources for curing the UV-curable decolorizable ink and for erasing the UV-curable decolorizable ink. It is possible to realize the compact size and the low cost of the printing apparatus. The UV light source is controlled such that the light amount of the ultraviolet light, which is radiated onto the UV-curable decolorizable ink on the medium, is larger when the erasing process is performed than when the printing process is performed. Therefore, in the printing process, the UV-curable decolorizable ink can be cured so that the UV-curable decolorizable ink is not decolorized. On the other hand, in the erasing process, the UV-curable decolorizable ink can be reliably decolorized.

In the printing apparatus of the present invention, in the erasing mode, the controller may control the UV light source to radiate the ultraviolet light onto the ink deposited to the medium for a period of time longer than that in the printing mode.

In this case, the radiation time of the ultraviolet light radiated from the UV light source is changed between the printing process and the erasing process. Accordingly, when the printing process is performed, the curing component can be cured in a small light amount of such an extent that the coloring component is not decolorized. On the other hand, when the erasing process is performed, then the ultraviolet light is radiated in a large light amount, and the coloring component can be decolorized easily and reliably.

In the printing apparatus of the present invention, in the erasing mode, the controller may control the UV light source to radiate the ultraviolet light onto the ink deposited to the medium at a radiation intensity greater than that in the printing mode.

In this case, the radiation intensity of the ultraviolet light radiated from the UV light source is changed between the printing process and the erasing process. Accordingly, when the printing process is performed, the curing component can be cured in such a small light amount that the coloring component is not decolorized. On the other hand, when the erasing process is performed, then the ultraviolet light is radiated in a large light amount, and thus the coloring component can be decolorized easily and reliably.

In the printing apparatus of the present invention, in the erasing mode, the controller may control the movement mechanism to make the medium to pass through the radiation area of the UV light source at a velocity smaller than that in the printing mode.

In this case, the velocity of the medium to pass across the UV light source is changed between the printing process and the erasing process. Accordingly, when the printing process is performed, the curing component can be cured in such a small light amount that the coloring component is not decolorized. On the other hand, when the erasing process is performed, then the ultraviolet light is radiated in a large light amount, and thus the coloring component can be decolorized easily and reliably.

The printing apparatus of the present invention may further include a scanning mechanism which scans the ink-jet head relatively with respect to the medium, wherein the UV light source is provided integrally with the ink-jet head.

In this case, the UV light source is also subjected to the scanning in accordance with the driving and scanning of the ink-jet head by means of the scanning mechanism. Therefore, it is unnecessary to distinctly provide any scanning mechanism for the UV light source. It is possible to realize the compact size and the low cost. Further, the UV light source is operated integrally with the ink-jet head. Therefore, a part of the wiring member for the UV light source can be also used as the wiring member for the ink-jet head. Therefore, it is possible to further reduce the number of parts.

In the printing apparatus of the present invention, the medium may include a first medium which is used in the erasing process and a second medium which is used in the printing process; the printing apparatus may further include an erasing tray which accommodates the first medium and a printing tray which accommodates the second medium; the movement mechanism may selectively transport the first and second media, accommodated in the erasing tray and the printing tray respectively, to pass through the discharge area and the radiation area of the UV light source; and when the receiver receives the instruction of the printing mode during the erasing process, the controller may control the UV light source and the movement mechanism to interrupt the erasing process and to return the first medium, which is in the middle of the erasing process, to the erasing tray, and then, the controller may control the ink-jet head, the UV light source, and the movement mechanism to perform the printing process for the second medium accommodated in the printing tray.

Accordingly, the printing process can make the interruption in the erasing process. Therefore, when a user intends to perform the printing immediately, the printing can be started without waiting for the completion of the proceeding erasing process. The convenience is improved.

In the printing apparatus of the present invention, the controller may further control the UV light source and the movement mechanism after completion of the printing process to restart the erasing process for the second medium in the middle of the erasing.

In this case, even when the user does not input the start of the erasing process for the recording objective medium in the middle of the erasing after the interrupt printing, the controller automatically restarts the erasing process. Therefore, it is possible to mitigate the operation load exerted on the user.

The printing apparatus of the present invention may further include a position-detecting section which detects a transport position of the medium which is transported by the movement mechanism; and a storage unit which stores a data of the transport position of the medium detected by the position-detecting section, wherein the controller may control the storage unit to store the data of a transport position of the second medium in the middle of the erasing process detected by the position-detecting section when the receiver receives the instruction of the printing mode during the erasing process; and the controller may control to restart the erasing process from the transport position stored in the storage unit when the erasing process is restarted.

In this case, the erasing process, which is to be performed for the medium in the middle of the erasing, is restarted from the transport position at the interruption or break of the previous erasing process. Therefore, any area, which is completed for the erasing, is not subjected to the erasing process again in a useless manner, and the process efficiency is improved.

In the printing apparatus of the present invention, the UV light source may have a length longer than a length of the medium in a direction perpendicular to the predetermined direction, the UV light source may be provided independently from the ink-jet head, and the UV light source may be fixed in the direction perpendicular to the predetermined direction.

In this case, the radiation area of the UV light source covers the medium in the widthwise direction (direction perpendicular to the predetermined direction). Therefore, the ultraviolet light can be radiated over the entire medium in the widthwise direction. Therefore, when the medium is moved in the predetermined direction, the ultraviolet light can be radiated onto the whole medium. Further, the UV light source is provided independently from the ink-jet head, and the UV light source is fixed in the direction perpendicular to the direction in which the medium is transported. Therefore, it is unnecessary to drive the ink-jet head when the erasing process is performed. It is possible to reduce, for example, the noise and the vibration accompanied by the driving of the head.

The printing apparatus of the present invention may further include an instructing unit which instructs the operation mode to the controller.

In this case, it is unnecessary to prepare any external equipment such as a personal computer in order to instruct the operation mode to the controller. The desired operation mode can be instructed with the instructing unit such as a button provided for the printing apparatus.

According to a second aspect of the present invention, there is provided a program for controlling a printing apparatus to perform printing and decolorization on a medium, including: controlling the printing apparatus to perform the printing and the decolorization by using a ink containing a coloring component which is decolorizable by ultraviolet light and a curing component which is curable by the ultraviolet light, a light amount of the ultraviolet light required for curing being smaller than a light amount of the ultraviolet light required for the decolorization; controlling the printing apparatus to execute the printing by using the ink when a printing mode is selected from a plurality of operation modes including the printing mode and an erasing mode, and controlling the printing apparatus to execute the decolorization of the ink when the erasing mode is selected from the plurality of operation modes; controlling, when the printing is performed, the inkjet head to discharge the ink toward the medium to deposit the ink to the medium, and controlling the UV light source to radiate the ultraviolet light, in a light amount with which the coloring component is not decolorized, toward the ink deposited to the medium to cure the curing component; and controlling, when the decolorization is performed, the UV light source to radiate, toward the medium, the ultraviolet light in a light amount greater than the light amount of the ultraviolet light radiated when the printing is performed to decolorize the coloring component.

According to a third aspect of the present invention, there is provided a storage medium including the program of the present invention, the program being stored thereon.

According to the second and the third aspects of the present invention, the control can be made, for example, such that the same UV light source is used for both of the printing process and the erasing process. Therefore, in this case, it is unnecessary to provide distinct UV light sources for the curing and the decolorization of the UV-curable decolorizable ink respectively. It is possible to realize the compact size and the low cost. Further, the control is made such that the light amount of the ultraviolet light, which is radiated onto the UV-curable decolorizable ink on the medium in the erasing process, is larger than that in the printing process. Therefore, in the printing process, the UV-curable decolorizable ink can be cured so that the ink is not decolorized. On the other hand, in the erasing process, the UV-curable decolorizable ink can be decolorized.

According to a fourth aspect of the present invention, there is provided a method for performing printing and decolorization on a medium, including: providing a ink containing a coloring component which is decolorizable by ultraviolet light and a curing component which is curable by the ultraviolet light, a light amount of the ultraviolet light required for curing being smaller than a light amount of the ultraviolet light required for the decolorization; discharging the ink toward the medium to deposit the ink and curing the curing component by radiating the ultraviolet light, in a light amount with which the coloring component is not decolorized, toward the ink deposited to the medium, when a printing mode is selected from a plurality of operation modes including the printing mode and an erasing mode; and decolorizing the coloring component by radiating, toward the medium, the ultraviolet light in a light amount greater than the light amount of the ultraviolet light radiated in the printing mode, when the erasing mode is selected from the plurality of operation modes.

According to the fourth aspect of the present invention, the UV-curable decolorizable ink, which is deposited to the medium, is cured on the medium by the ultraviolet light. Therefore, the coloring component is fixedly secured without being deeply permeated into the medium as compared with the water base ink or the like. Accordingly, when the erasing process is performed, the ultraviolet light is sufficiently absorbed by the coloring component with ease. It is possible to efficiently decolorize the coloring component. Therefore, the medium, on which the printing has been once performed, can be reused quickly and reliably. Further, the UV-curable decolorizable ink is cured and fixedly secured on the surface of the medium. Therefore, the printing and the erasing can be performed not only on the material such as the paper having the high water permeability but also on the material having the low water permeability including, for example, the metal and the resin. Further, the light amount of the ultraviolet light radiated onto the UV-curable decolorizable ink on the medium, which is brought about in the erasing process, is larger than that brought about in the printing process. Therefore, the UV-curable decolorizable ink can be cured so that the UV-curable decolorizable ink is not decolorized in the printing process, while the UV-curable decolorizable ink can be decolorized in the erasing process.

According to a fifth aspect of the present invention, there is provided an ink including a coloring component which is decolorizable by ultraviolet light; and a curing component which is curable by the ultraviolet light. A light amount of the ultraviolet light required to cure the curing component is smaller than a light amount of the ultraviolet light required to decolorize the coloring component.

According to the fifth aspect of the present invention, the coloring component can be efficiently decolorized by using the ink of the present invention (UV-curable decolorizable ink). The medium, which has been once subjected to the printing, can be reused quickly and reliably. The UV-curable decolorizable ink can be cured and fixedly secured on the surface of the medium by radiating the ultraviolet light before the UV-curable decolorizable ink is deeply permeated into the medium. Therefore, the printing and the erasing can be performed on a variety of materials. The light amount of the ultraviolet light radiated onto the UV-curable decolorizable ink on the medium in the erasing process is larger than that in the printing process. Therefore, the UV-curable decolorizable ink can be cured so that the UV-curable decolorizable ink is not decolorized in the printing process, while the UV-curable decolorizable ink can be decolorized in the erasing process.

DESCRIPTION OF THE PREFERRED EMBODIMENTS

Embodiments according to the present invention will be explained below with reference to the drawings.

First Embodiment

Figure 1:
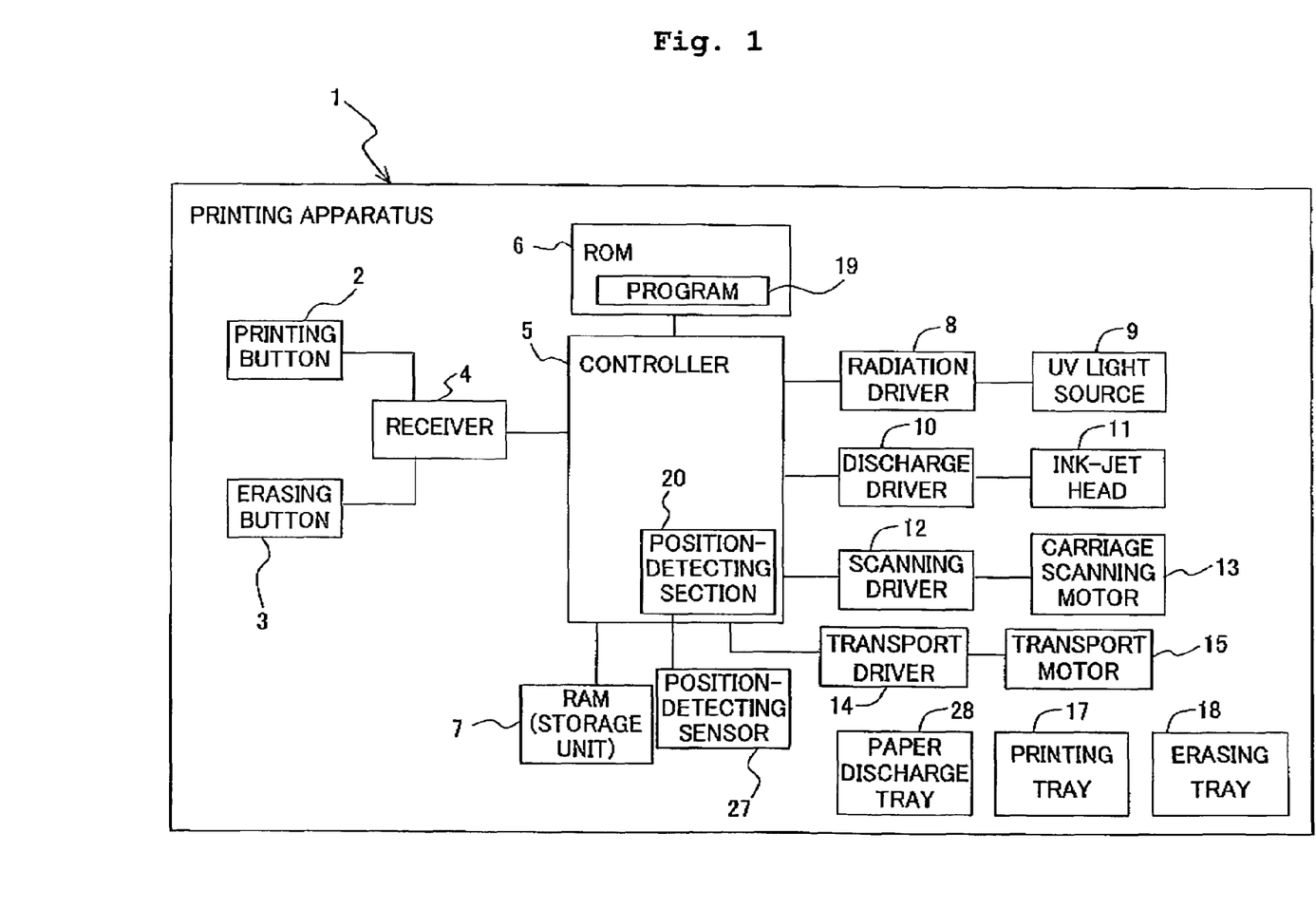
FIG. 1 shows a block diagram illustrating a printing apparatus according to a first embodiment of the present invention.

FIG. 1 schematically shows a printing apparatus 1 according to a first embodiment of the present invention. As shown in FIG. 1, the printing apparatus 1 is a multifunction machine principally comprising: a printing button (first instructing unit) 2 which is provided to select and input the printing mode by a user; an erasing button (second instructing unit) 3 which is provided to select and input the erasing mode; a receiver 4 which is connected to the printing button 2 and the erasing button 3 and which receives the mode instruction from each of the buttons 2, 3; a controller 5 which is connected to the receiver 4 and which includes CPU for controlling respective sections as described later on and a position-detecting section 20 for detecting the transport position of a paper sheet 23 (see FIG. 2) as a recording medium; a group of instruments (an UV light source 9, an ink-jet head 11, a carriage scanning motor 13, and a transport motor 15 as described later on) which are controlled by the controller 5 on the basis of the mode instruction supplied from the receiver 4; a radiation driver 8; a transport roller 16 which transports the recording medium; ROM 6 which is connected to the controller 5 and which stores a program 19 so that the program 19 can be read out in order to control the group of instruments; and RAM (storage unit) 7 which is connected to the controller 5 and which stores the transport position of the paper sheet 23 (see FIG. 2) detected by the position-detecting section 20.

The UV light source 9, which radiates the ultraviolet light toward the paper sheet 23 (see FIG. 2), is connected via a radiation driver 8 to the controller 5. The radiation driver 8 converts the control signal supplied from the controller 5 into the signal capable of driving the UV light source 9. The ink-jet head 11, which discharges, toward the paper sheet 23 (see FIG. 2), the UV-curable decolorizable ink supplied from an ink tank (not shown), is connected via a discharge driver 10 to the controller 5. The discharge driver 10 converts the control signal supplied from the controller 5 into the signal capable of driving the ink-jet head 11.

The UV-curable decolorizable ink, which is discharged by the ink-jet head 11, contains a coloring component which is decolorizable by the ultraviolet light and a curing component which is curable by the ultraviolet light, wherein the light amount of the ultraviolet light, which is required for the curing, is smaller than the light amount of the ultraviolet light which is required for the decolorization. Specifically, for example, Basic Blue 5, Basic Blue 7, Basic Violet 1, Basic Violet 10, Basic Orange 22, Basic Red 1:1, Basic Yellow 1, Basic Yellow 2, and Basic Yellow 3, which are basic dyes, are appropriately used for the coloring component which is decolorizable by the ultraviolet light. Further, it is also allowable to use, for example, those containing a colorizing compound, a color-developing agent, and a vehicle wherein the colorizing compound and the color-developing agent are encapsulated in microcapsules, for the coloring component which is decolorizable by the ultraviolet light. On the other hand, the curing component, which is curable by the ultraviolet light, is appropriately composed of: for example, a monomer (resin diluent) including, for example, a monomer based on acrylate of the radical polymerization type and a monomer based on oxirane of the cation polymerization type; an oligomer (resin main component) including, for example, vinyl-based oligomer; and a photopolymerization initiator including, for example, α-hydroxyketones and bensil dimethylketal.

The carriage scanning motor 13 which is provided to scan a carriage 26 (see FIG. 2) is connected via a scanning driver 12 to the controller 5, the carriage 26 carrying the ink-jet head 11 in the direction (scanning direction) perpendicular to the transport direction of the paper sheet 23 (see FIG. 23). The scanning driver 12 converts the control signal supplied from the controller 5 into the signal capable of driving the scanning motor 13. The transport motor 15, which is provided to drive and rotate the transport roller 16 for feeding the paper sheet, is connected via a transport driver 14 to the controller 5. The transport driver 14 converts the control signal supplied from the controller 5 into the signal capable of driving the transport motor 15.

The printing apparatus 1 further includes a printing tray 17 which accommodates the paper sheet as the objective of the printing process, and an erasing tray 18 which accommodates the paper sheet as the objective of the erasing process. The paper sheet is selectively fed to the transport roller 16 from any one of the trays 17, 18. That is, the transport mechanism (movement mechanism), which transports the paper sheet to pass through the discharge area of the ink-jet head 11 and the radiation area of the UV light source 9, for example, by the transport motor 15 and the transport roller 16. A position-detecting sensor 27, which detects the transport position of the paper sheet 23 transported by the transport mechanism, is connected to the controller 5. The position signal, which is generated by the position-detecting sensor 27, is fed to the position-detecting section 20 of the controller 5. The position-detecting section 20 of the controller 5 detects the transport position of the paper sheet 23 (see FIG. 2) by making a judgment from the position signal fed from the position-detecting sensor 27 and the amount of rotation of the transport motor 15. The printing apparatus 1 further includes a paper discharge tray 28 to which the paper sheet 23 is discharged after being subjected to the printing or the erasing by the ink-jet head 11 and the UV light source 9.

Figure 2:
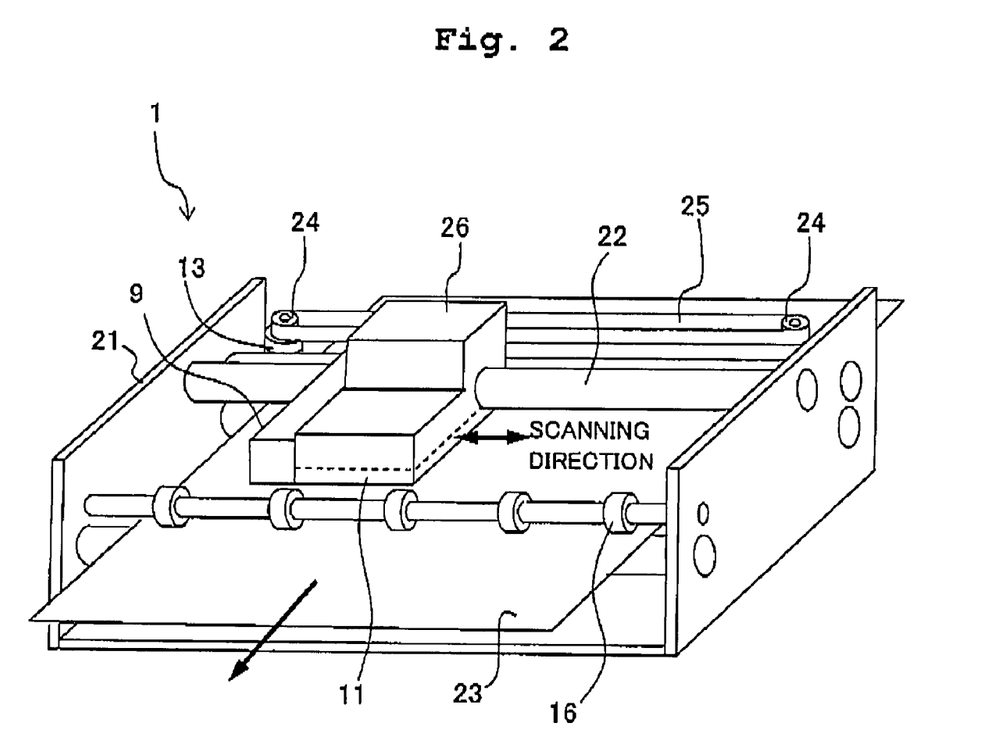
FIG. 2 shows a perspective view illustrating main components of the printing apparatus shown in FIG. 1.

FIG. 2 shows a perspective view illustrating main components of the printing apparatus 1 shown in FIG. 1. As shown in FIG. 2, the printing apparatus 1 has a guide rod 22 which is provided to span a casing 21. The carriage 26, to which the ink-jet head 11 is fixed, is supported slidably by the guide rod 22. A head surface in which nozzle holes (not shown) are formed is provided on the lower surface of the ink-jet head 11. The UV-curable decolorizable ink is discharged toward the paper sheet 23 transported by the transport roller 16 thereunder. The UV light source 9 is fixed to a side-surface of the carriage 26 in the scanning direction. The ink-jet head 11 and the UV light source 9 are movable in the scanning direction in an integrated manner. A light-emitting surface (not shown) is provided at the lower surface of the UV light source 9. The ultraviolet light is radiated onto the paper sheet 23 transported by the transport roller 16 thereunder. The wavelength band of the ultraviolet light, which is required to cure the UV-curable decolorizable ink described above, is about 250 to 420 nm. The wavelength band, which is required to decolorize the UV-curable decolorizable ink, is about 300 to 400 nm. Those usable as the UV light source 9 include, for example, a metal halide lamp which emits the ultraviolet light of a broad wavelength region having peaks, for example, at wavelengths of 310 nm and 380 nm, a high pressure mercury ultraviolet lamp which emits the ultraviolet light of a wavelength region having a high peak, for example, at a wavelength of 365 nm, and/or a ultraviolet LED which emits the ultraviolet light of a wavelength region having a high peak, for example, at a wavelength of 365 nm.

The ink-jet head 11 is joined to a timing belt 25 which is wound around a pair of pulleys 24. The timing belt 25 is arranged in parallel to the longitudinal direction of the guide rod 22. The carriage scanning motor 13, which rotates in the CW and CCW directions, is provided for one pulley 24. When the pulley 24 is driven to rotate in the CW or CCW direction, the timing belt 25 makes the reciprocating movement. The ink-jet head 11 is subjected to the scanning operation together with the UV light source 9 along the guide rod 22 in accordance with the movement of the timing belt 25. That is, the scanning mechanism for the ink-jet head 11 includes the carriage scanning motor 13, the guide rod 22, the pulleys 24, and the timing belt 25.

Figure 3:
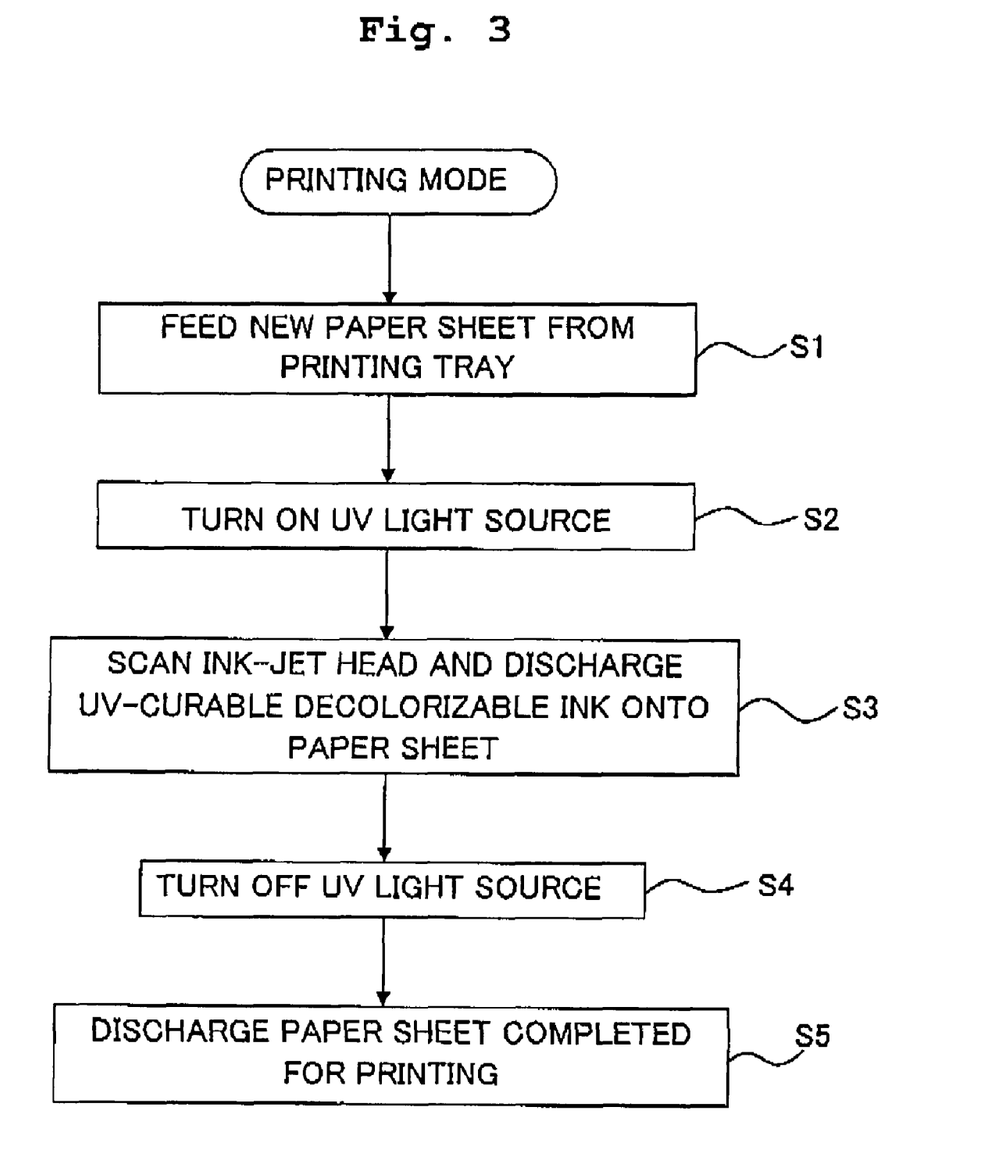
FIG. 3 shows a flow chart illustrating the process to be performed in the printing mode of the printing apparatus shown in FIG. 1.

Next, an explanation will be made about the operation of the printing apparatus 1. FIG. 3 shows a flow chart illustrating the process in the printing mode of the printing apparatus 1 shown in FIG. 1. As shown in FIGS. 1 and 3, when the user depresses the printing button 2, then the instruction of the printing mode is transmitted via the receiver 4 to the controller 5, and the controller 5 drives and controls, for example, the transport motor 15 so that the new paper sheet 23 is fed from the printing tray 17 (Step S1). Subsequently, the controller 5 turns ON the UV light source 9 (Step S2). The controller 5 controls the ink-jet head 11 to discharge the UV-curable decolorizable ink toward the paper sheet 23 during scanning the ink-jet head 11, while maintaining the state in which the UV light source 9 is turned ON to radiate the ultraviolet light (Step S3). In this procedure, the ultraviolet light from the UV light source 9 is radiated so that the ultraviolet light is also scanned across the paper sheet 23, because the UV light source 9 is provided integrally with the ink-jet head 11. In other words, the printing process is carried out in accordance with Steps S2 and S3 described above. In this procedure, the UV light, which is in a light amount of such an extent that the curing component is cured and which is in a light amount of such an extent that the coloring component is not decolorized, is radiated by the UV light source 9 onto the UV-curable decolorizable ink landed on the paper sheet 23. When the printing is completed, the controller 5 turns OFF the UV light source 9 (Step S4). The paper sheet 23, which has been subjected to the printing, is fed and discharged by the transport roller 16 (Step S5).

Figure 4:
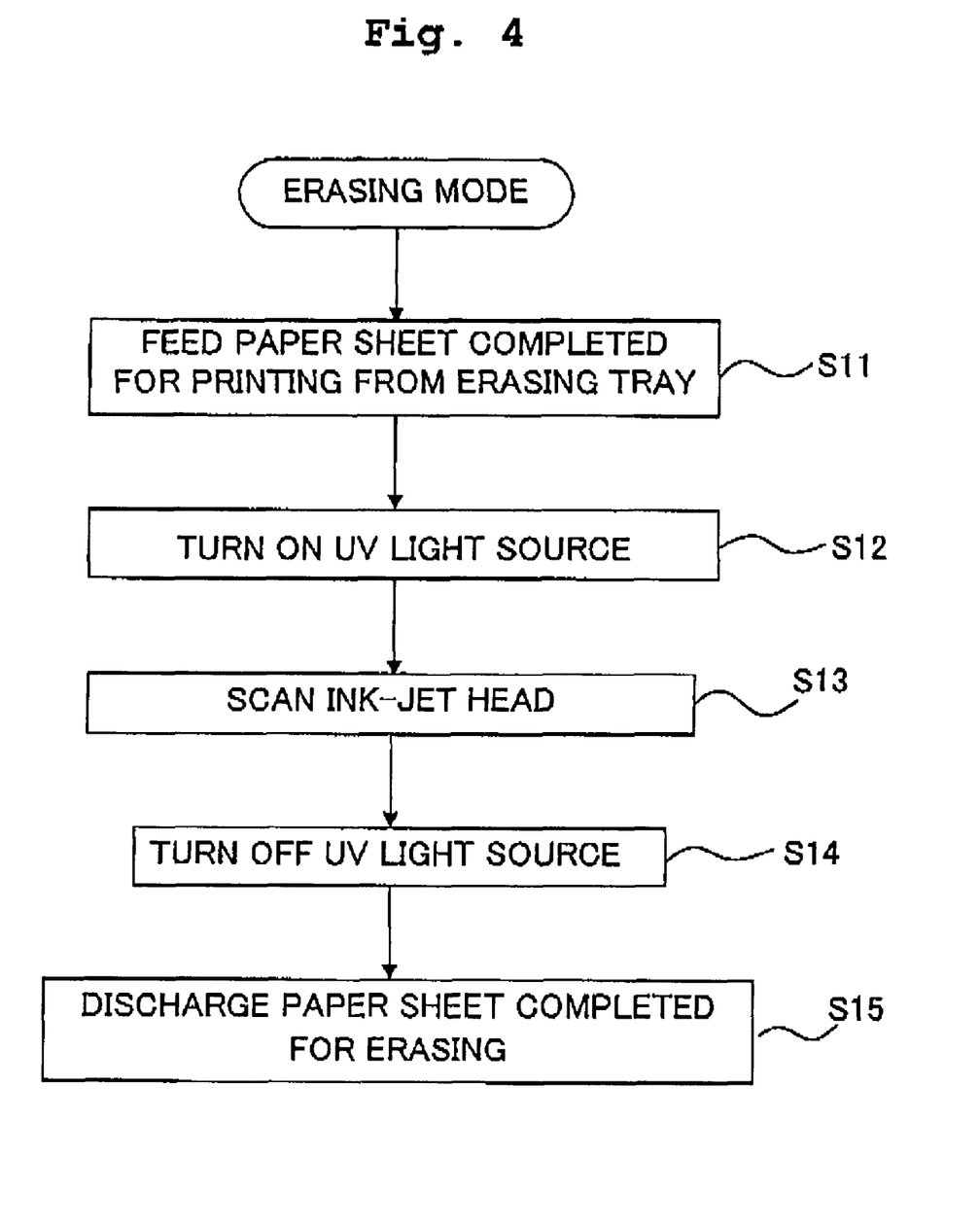
FIG. 4 shows a flow chart illustrating the process to be performed in the erasing mode of the printing apparatus shown in FIG. 1.

FIG. 4 shows a flow chart illustrating the process in the erasing mode of the printing apparatus 1 shown in FIG. 1. As shown in FIGS. 1 and 4, when the user depresses the erasing button 3, then the instruction of the erasing mode is transmitted via the receiver 4 to the controller 5, and the controller 5 drives and controls, for example, the transport motor 15 so that the paper sheet 23 completed for the printing is fed from the erasing tray 18 (Step S11). Subsequently, the controller 5 turns ON the UV light source (Step S12). The controller 5 controls the ink-jet head 11 to perform the scanning operation without performing the discharge operation, while maintaining the state in which the UV light source 9 is turned ON to radiate the ultraviolet light (Step S13). Accordingly, the UV light source 9, which is subjected to the scanning operation together with the ink-jet head 11, radiates the ultraviolet light toward the paper sheet 23 to perform the erasing process. In this procedure, the controller 5 controls the UV light source 9, the carriage scanning motor 13, and the transport motor 15 so that the UV light, which has a light amount of such an extent that the coloring component is decolorized, is radiated onto the UV-curable decolorizable ink disposed on the paper sheet 23. That is, in the erasing process, the coloring component is decolorized by radiating the ultraviolet light from the UV light source 9 so that the light amount of the ultraviolet light per unit area, which is provided for the area to be subjected to the decolorization, is larger than the light amount of the ultraviolet light per unit area radiated when the printing process is performed.

In particular, the controller 5 controls the UV light source 9 so that the total light amount of the ultraviolet light radiated from the UV light source 9 onto the UV-curable decolorizable ink deposited on the paper sheet 23, which is provided in the erasing mode, is larger than that provided in the printing mode. For example, the controller 5 controls the transport motor 15 so that the transport velocity of the paper sheet 23 with respect to the UV light source 9 is slower in the erasing mode than in the printing mode. Alternatively, the controller 5 may control the carriage scanning motor 13 so that the scanning velocity of the UV light source 9 is slower in the erasing mode than in the printing mode. Further alternatively, the controller 5 may control the output of the UV light source 9 so that the radiation intensity of the ultraviolet light is larger in the erasing mode than in the printing mode. Further alternatively, the control operations as described above may be performed simultaneously. The amount of UV light radiated onto the UV-curable decolorizable ink disposed on the paper sheet 23 is also adjusted in the printing mode by controlling at least one of the output of the UV light source 9, the scanning velocity brought about by the carriage scanning motor 13, and the transport velocity of the paper sheet 23 brought about by the transport motor 15.

Finally, the controller 5 turns OFF the UV light source 9 (Step S14), and the paper sheet 23 completed for the erasing is discharged (Step S15).

Figure 5:
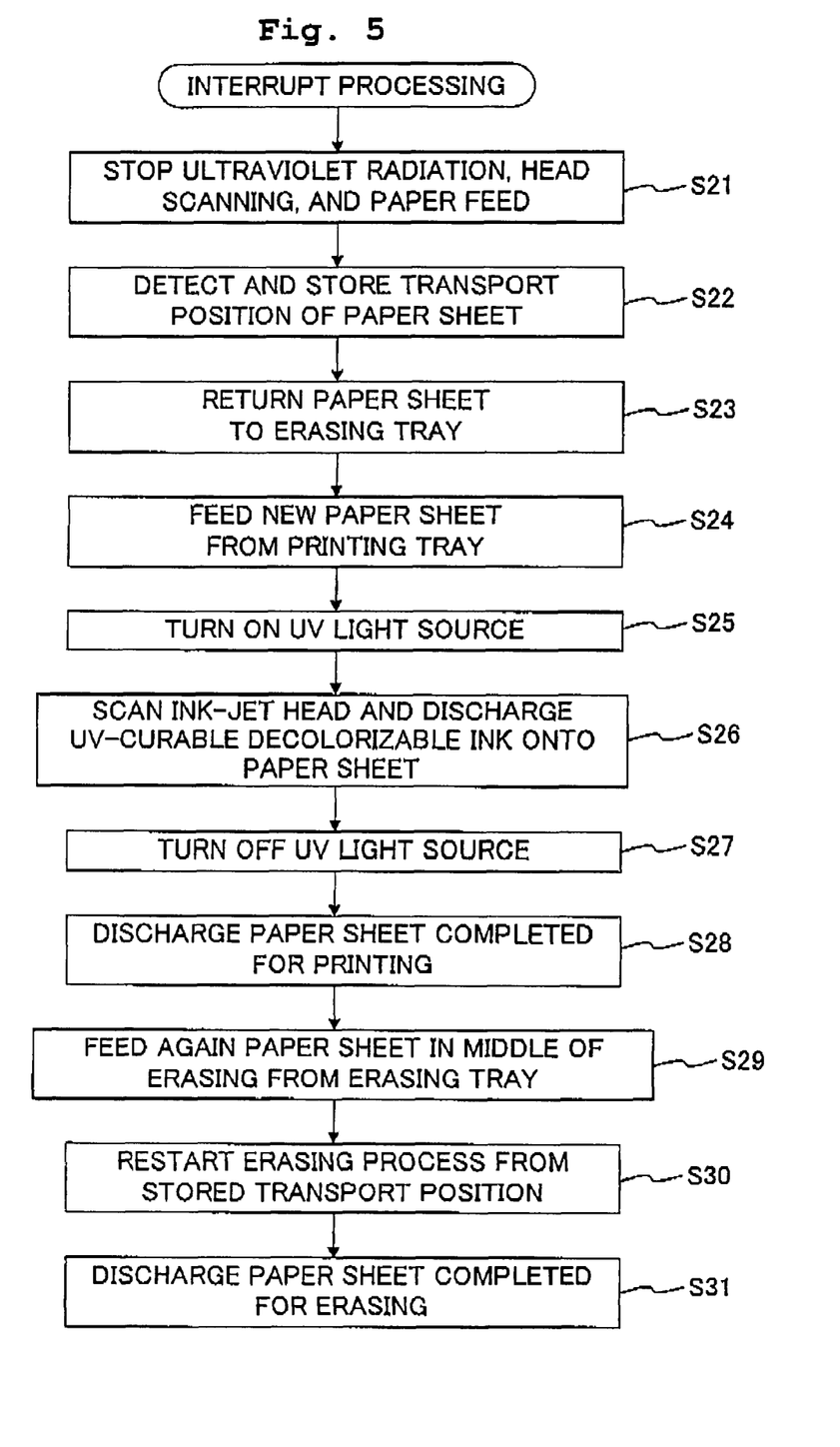
FIG. 5 shows a flow chart illustrating the interrupt process of the printing apparatus shown in FIG. 1.

Next, an explanation will be made about the operation of the printing apparatus 1 when the printing process request makes the interruption during the erasing process. FIG. 5 shows a flow chart illustrating the interrupt process of the printing apparatus 1 shown in FIG. 1. As shown in FIGS. 1 and 5, when the user depresses the printing button 2 during the erasing process described above, the interrupt instruction of the printing mode is transmitted via the receiver 4 to the controller 5. Accordingly, the controller 5 breaks the erasing process by stopping the ultraviolet radiation by the UV light source 9, stopping the scanning of the ink-jet head 11, and stopping the paper feed by the transport motor 15 (Step S21). The controller 5 stores and memories, in RAM 7, the transport position of the paper sheet 23 at the break of the erasing process detected by the position-detecting section 20 (Step S22).

Subsequently, the controller 5 controls the transport motor 15 to return the paper sheet 23 in the middle of the erasing to the erasing tray 18, for example, by reversely rotating the transport motor 15 (Step S23). Subsequently, the controller 5 drives and controls the transport motor 15 to feed the new paper sheet 23 from the printing tray 17 (Step S24). Subsequently, the controller 5 the UV light source 9 to turn ON (Step S25). The controller 5 controls the ink-jet head 11 to discharge the UV-curable decolorizable ink toward the paper sheet 23 during scanning the ink-jet head 11, while remaining the state in which the UV light source 9 radiates the ultraviolet light (Step S26). In this situation, the UV light source 9, the carriage scanning motor 13, and the transport motor 15 are controlled so that the ultraviolet light is radiated onto the UV-curable decolorizable ink deposited to the paper sheet 23 in a light amount of such an extent that the curing component is sufficiently cured but the coloring component is not decolorized. Accordingly, the UV light source 9, which is scanned together with the ink-jet head 11, radiates the ultraviolet light toward the UV-curable decolorizable ink deposited to the paper sheet 23 in the light amount of such an extent that the coloring component is not decolorized, and thus the curing component is cured.

When the printing is completed, then the controller 5 turns OFF the UV light source 9 (Step S27), and the paper sheet 23, which is completed for the printing, is fed and discharged by the transport roller 16 (Step S28). Subsequently, the controller 5 drives and controls, for example, the transport motor 15, and the paper sheet 23, which is in the middle of the erasing, is fed again from the erasing tray 18 (Step S28). Subsequently, the controller 5 restarts the erasing process from the transport position at the break stored in RAM 7 (Step S29). The controller 5 discharges the paper sheet 23 completed for the erasing (Step S30).

When the process constructed as described above is adopted, the UV-curable decolorizable ink, which is discharged from the ink-jet head 11 and which is deposited to the paper sheet 23, is cured on the paper sheet 23 by the ultraviolet light radiated from the UV light source 9. Therefore, the coloring component is hardly permeated deeply into the paper sheet 23 as compared with the case in which the water base ink is used. Accordingly, when the erasing process is performed, the ultraviolet light, which is radiated from the UV light source 9, is sufficiently absorbed by the coloring component with ease. It is possible to efficiently decolorize the coloring component. Therefore, the recording medium, on which the printing has been once performed, can be reused quickly and reliably. The UV-curable decolorizable ink is cured and fixedly secured on the surface of the recording medium. Therefore, the printing process and the erasing process can be performed not only on the medium having the high permeability such as the paper but also on the medium having the low permeability including, for example, the metal, the resin, and the wood.

The same UV light source 9 is used for both of the printing process and the erasing process. Therefore, it is unnecessary to independently provide the UV light sources for the curing and the erasing of the UV-curable decolorizable ink. It is possible to realize the small size and the low cost of the printing apparatus 1. The control is made such that the light amount of the ultraviolet light radiated onto the UV-curable decolorizable ink disposed on the paper sheet 23 in the printing process is smaller than the light amount in the erasing process. Therefore, in the printing process, the UV-curable decolorizable ink can be cured so that the UV curable decolorizable ink is not decolorized. On the other hand, in the erasing process, the UV-curable decolorizable ink can be decolorized.

The UV light source 9 is integrally attached to the ink-jet head 11. Therefore, it is unnecessary to distinctly provide any scanning mechanism for the UV light source 9. It is possible to reduce the number of parts and realize the small size of the printing apparatus. Further, the UV light source 9 is operated integrally with the ink-jet head 11. Therefore, the wiring member such as a flexible flat cable (not shown) can be partially used commonly to the UV light source 9 and the ink-jet head 11. It is also possible to further reduce the number of parts.

The printing apparatus 1 makes it possible to interrupt the erasing process to perform the printing process. Therefore, when the user intends to the printing immediately, the printing can be started without waiting for the completion of the proceeding erasing process. After the interrupt printing, the controller 5 can also automatically restart the erasing process even when the user does not input the start of the erasing process for the paper sheet in the middle of the erasing. Therefore, the operation load on the user is mitigated. Further, the control can be made such that the erasing process, which is to be performed for the paper sheet having been in the middle of the erasing, is restarted from the transport position at the break during the previous erasing process. Therefore, the erasing process is not performed in a useless manner for any overlapped area for which the erasing has been completed. The processing efficiency is improved.

Second Embodiment

Figure 6:
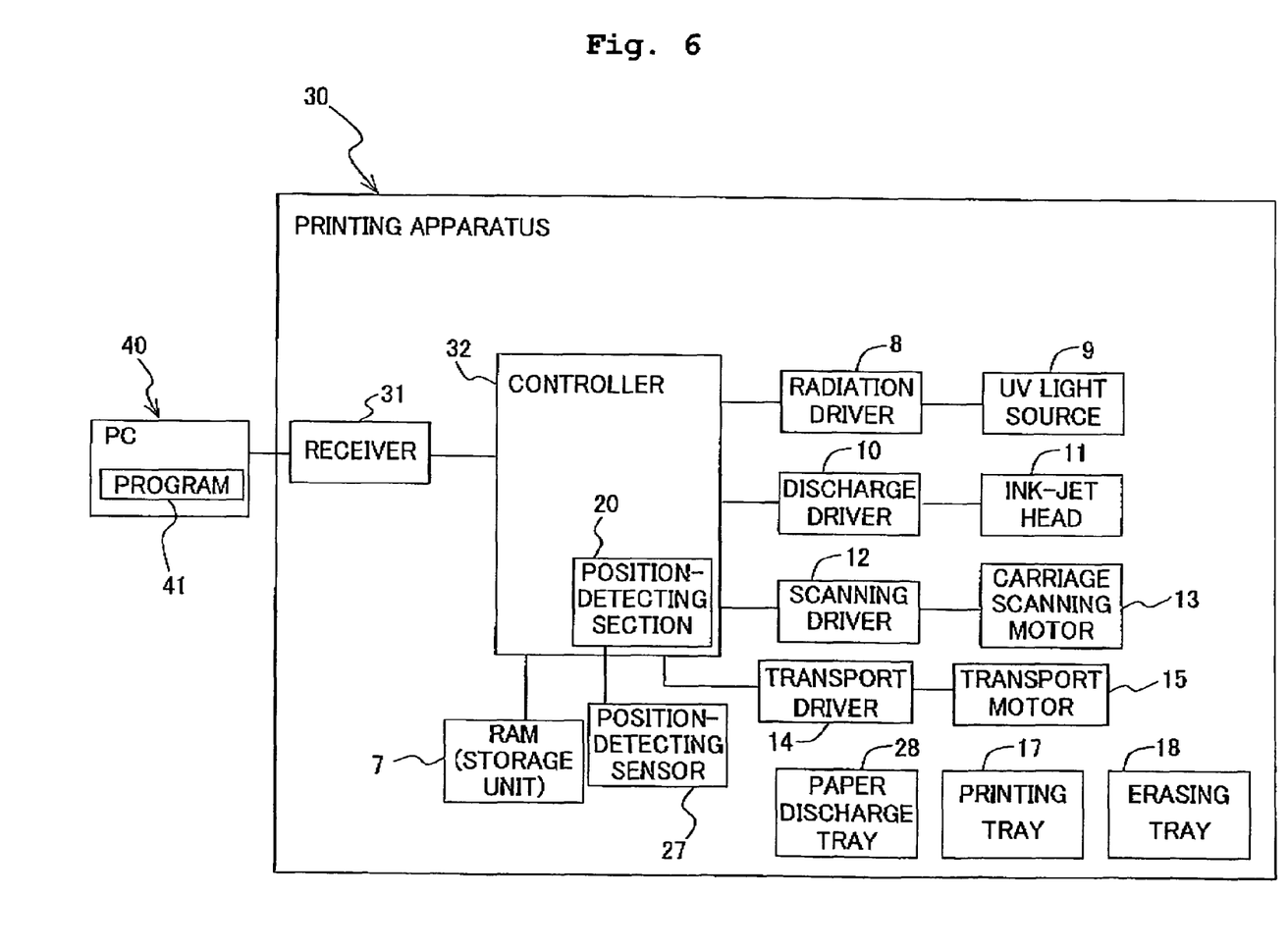
FIG. 6 shows a block diagram illustrating a printing apparatus according to a second embodiment of the present invention.

Next, a second embodiment will be explained. FIG. 6 shows a block diagram illustrating a printing apparatus 30 according to the second embodiment of the present invention. As shown in FIG. 6, the printing apparatus 30 of this embodiment is used by being connected to a personal computer 40. A program 41, which controls the printing apparatus 30, is installed into the personal computer 40 from a storage medium such as CD-ROM (not shown). That is, when the user inputs the printing mode or the erasing mode by using the program 41 running on the personal computer 40, the mode instruction is transmitted to the printing apparatus 30. The printing apparatus 30 is provided with a receiver 31 which serves as an interface for receiving the signal supplied from the personal computer 40. A controller 32 including CPU or the like, which controls the ink-jet head 11, the UV light source 9, the carriage scanning motor 13, and the transport motor 15 on the basis of the instruction from the personal computer 40, is connected to the receiver 31.

In the arrangement as described above, the program for controlling the printing apparatus is installed in the personal computer 40, and the controller 32 of the printing apparatus 30 controls, for example, the ink-jet head 11 and the UV light source 9 in accordance with the instruction from the personal computer 40. Therefore, it is possible to simplify the printing apparatus 30. The other structural components are the same as those of the first embodiment, to which the same reference numerals are affixed, and any explanation thereof will be omitted.

Third Embodiment

Figure 7:
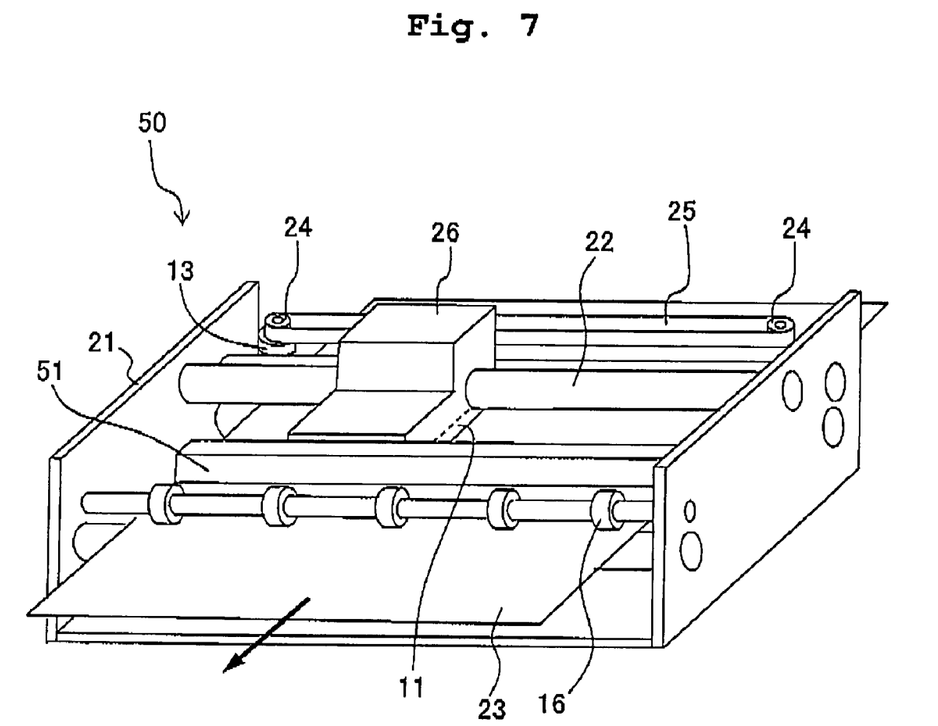
FIG. 7 shows a perspective view illustrating main components of a printing apparatus according to a third embodiment of the present invention.

Next, a third embodiment will be explained. FIG. 7 shows a perspective view illustrating main components of a printing apparatus 50 according to the third embodiment of the present invention. As shown in FIG. 7, the printing apparatus 50 of this embodiment includes a line-shaped UV light source 51 which is long in one direction and which is arranged on the downstream side in the transport direction of the ink-jet head 11. The UV light source 51 is fixed to the casing 21 so that the longitudinal direction of the UV light source 51 is substantially parallel to the longitudinal direction of the guide rod 22 (which is the scanning direction as well). The UV light source 51 has an enough length that the ultraviolet light can be radiated at once over the entire width of the paper sheet 23.

In the case of the arrangement as described above, the ultraviolet light from the UV light source 51 is simultaneously radiated over the entire width of the paper sheet. Therefore, the ultraviolet light can be efficiently absorbed by the UV-curable decolorizable ink. It is possible to shorten the process time required in the erasing mode.

In the embodiments described above, the paper sheet 23 is transported in the direction perpendicular to the scanning direction by moving the paper sheet 23 with respect to the ink-jet head 11 and the UV light source 9. On the contrary, the paper sheet 23 may be allowed to stand still, and the ink-jet head 11 and the UV light source 9 may be moved in the direction perpendicular to the scanning direction. Alternatively, the UV light source and the ink-jet head may be provided independently. In this case, it is also allowable to provide a scanning mechanism for independently scanning the UV light source and the ink-jet head. Further alternatively, it is also allowable to independently provide a UV light source for curing the UV-curable decolorizable ink and a UV light source for decolorizing the UV-curable decolorizable ink. For example, the UV light source for the curing may be provided integrally with the ink-jet head, and the UV light source, which is long in the scanning direction and which is fixed to the casing, may be provided as the UV light source for the decolorization. In this arrangement, it is unnecessary to drive the ink-jet head during the erasing process, and it is possible to reduce the noise or the like. The number of the UV light source or UV light sources and the arrangement thereof may be arbitrary. The type of the UV light source is not limited to type described in the exemplary embodiments described above as well, which may be arbitrary in conformity with the characteristic of the UV-curable decolorizable ink to be used.

In the embodiments described above, the wavelength region of the ultraviolet light required to cure the UV-curable decolorizable and the wavelength region of the ultraviolet light required to decolorize the UV-curable decolorizable ink are overlapped with each other. When the UV light source, which radiates the ultraviolet light in the overlapped wavelength region, is used, one UV light source can be used for the curing and the decolorization. However, when the wavelength region of the ultraviolet light required to cure the UV-curable decolorizable and the wavelength region of the ultraviolet light required to decolorize the UV-curable decolorizable ink are not overlapped with each other, it is also allowable to provide UV light sources corresponding to the respective wavelength regions. The ultraviolet light, which is required to cure and/or decolorize the UV-curable decolorizable ink, may be the near ultraviolet light (wavelength region: 200 to 380 nm) or the far ultraviolet light (wavelength region: 10 to 200 nm).

As described above, the printing apparatus, the program, the storage medium, and the method according to the present invention provide the following excellent effects. That is, it is possible to reuse the recording medium quickly and reliably, and the printing and the erasing can be performed on a variety of materials. Further, it is possible to realize the compact size and the low cost. The present invention is widely applicable to the printing apparatus such as the ink-jet printer in which the effects can be significantly exhibited.

What is claimed is:

1. A printing apparatus which performs printing on a medium, comprising:
    an ink-jet head which discharges an ink toward the medium, the ink containing a coloring component which is decolorizable by ultraviolet light and a curing component which is curable by the ultraviolet light, and a light amount of the ultraviolet light required for curing being smaller than a light amount of the ultraviolet light required for decolorization;
    a UV light source which radiates the ultraviolet light toward the medium;
    a movement mechanism which moves the medium in a predetermined direction relative to the ink-jet head and the UV light source to move a discharge area in which the ink-jet head discharges the ink and a radiation area in which the UV light source radiates the ultraviolet light; and
    a controller which receives any one of instructions of a plurality of operation modes including a printing mode and an erasing mode and which controls the ink-jet head and the UV light source in accordance with the instructed mode,
    wherein when the printing mode is selected, the controller controls the inkjet head and the UV light source to perform a printing process in which the ink-jet head discharges the ink toward the medium to deposit the ink to the medium, and the UV light source radiates the ultraviolet light, in a light amount that the coloring component is not decolorized, toward the ink deposited to the medium to cure the curing component; and
    when the erasing mode is selected, the controller controls the inkjet head and the UV source to perform an erasing process in which the UV light source radiates, toward the medium, the ultraviolet light in a light amount larger than the light amount of the ultraviolet light radiated during the printing process to decolorize the coloring component.

2. The printing apparatus according to claim 1, wherein in the erasing mode, the controller controls the UV light source to radiate the ultraviolet light onto the ink deposited to the medium for a period of time longer than that in the printing mode.

3. The printing apparatus according to claim 1, wherein in the erasing mode, the controller controls the UV light source to radiate the ultraviolet light onto the ink deposited to the medium at a radiation intensity greater than that in the printing mode.

4. The printing apparatus according to claim 1, wherein in the erasing mode, the controller controls the movement mechanism to make the medium to pass through the radiation area of the UV light source at a velocity smaller than that in the printing mode.

5. The printing apparatus according to claim 1, further comprising a scanning mechanism which scans the ink-jet head relatively with respect to the medium,
    wherein the UV light source is provided integrally with the ink-jet head.

6. The printing apparatus according to claim 1, wherein the medium includes a first medium which is used in the erasing process and a second medium which is used in the printing process;
    the printing apparatus further comprises an erasing tray which accommodates the first medium and a printing tray which accommodates the second medium;
    the movement mechanism selectively transports the first and second media, accommodated in the erasing tray and the printing tray respectively, to pass through the discharge area and the radiation area of the UV light source; and
    when the receiver receives the instruction of the printing mode during the erasing process, the controller controls the UV light source and the movement mechanism to interrupt the erasing process and to return the first medium, which is in the middle of the erasing process, to the erasing tray, and then, the controller controls the ink-jet head, the UV light source, and the movement mechanism to perform the printing process for the second medium accommodated in the printing tray.

7. The printing apparatus according to claim 6, wherein the controller further controls the UV light source and the movement mechanism after completion of the printing process to restart the erasing process for the second medium in the middle of the erasing.

8. The printing apparatus according to claim 7, further comprising:
   a position-detecting section which detects a transport position of the medium which is transported by the movement mechanism; and
   a storage unit which stores a data of the transport position of the medium detected by the position-detecting section,
   wherein the controller controls the storage unit to store the data of a transport position of the second medium in the middle of the erasing process detected by the position-detecting section when the receiver receives the instruction of the printing mode during the erasing process; and
   the controller controls to restart the erasing process from the transport position stored in the storage unit when the erasing process is restarted.

9. The printing apparatus according to claim 1, wherein the UV light source has a length longer than a length of the medium in a direction perpendicular to the predetermined direction, the UV light source is provided independently from the ink-jet head, and the UV light source is fixed in the direction perpendicular to the predetermined direction.

10. The printing apparatus according to claim 1, further comprising an instructing unit which instructs the operation mode to the controller.

* * * * *